United States Patent [19]

Grumstrup et al.

[11] Patent Number: 5,687,098
[45] Date of Patent: Nov. 11, 1997

[54] DEVICE DATA ACQUISITION

[75] Inventors: Bruce F. Grumstrup; Bruce A. Johnson; Jimmie L. Snowbarger, all of Marshalltown, Iowa

[73] Assignee: Fisher Controls International, Inc., Austin, Tex.

[21] Appl. No.: 549,998

[22] Filed: Oct. 30, 1995

[51] Int. Cl.$^6$ .............................. G06F 11/00; F16K 37/00
[52] U.S. Cl. ............... 364/551.01; 364/580; 364/550; 364/552; 364/558; 364/509; 73/168; 137/487.5
[58] Field of Search ................... 364/551.01, 148, 364/580, 550, 552, 558, 509; 137/487.5; 73/168

[56] References Cited

U.S. PATENT DOCUMENTS

| | | | |
|---|---|---|---|
| 4,029,122 | 6/1977 | Jaegtnes | 137/551 |
| 4,313,465 | 2/1982 | Holzem et al. | 137/599 |
| 4,376,450 | 3/1983 | Fayfield et al. | 137/554 |
| 4,555,766 | 11/1985 | Wright | 364/426 |
| 4,556,956 | 12/1985 | Dickerson et al. | 364/162 |
| 4,590,963 | 5/1986 | Gardner et al. | 137/554 |
| 4,615,722 | 10/1986 | Steffan et al. | 65/158 |
| 4,617,960 | 10/1986 | More | 137/554 |
| 4,672,529 | 6/1987 | Kupersmit | 364/130 |
| 4,694,391 | 9/1987 | Guttag et al. | 364/200 |
| 4,742,713 | 5/1988 | Abe et al. | 73/620 |
| 4,833,593 | 5/1989 | Takeuchi et al. | 364/191 |
| 4,858,103 | 8/1989 | Takeuchi et al. | 364/174 |
| 4,908,774 | 3/1990 | Lund et al. | 364/507 |
| 4,908,775 | 3/1990 | Palusamy et al. | 364/508 |
| 4,926,903 | 5/1990 | Kawai | 137/554 |
| 4,976,144 | 12/1990 | Fitzgerald | 73/168 |
| 5,086,273 | 2/1992 | Leon | 324/207.17 |
| 5,140,263 | 8/1992 | Leon | 324/207.17 |
| 5,154,080 | 10/1992 | Hill et al. | 73/597 |
| 5,198,973 | 3/1993 | Steutermann | 364/167.01 |
| 5,253,185 | 10/1993 | Mutchler et al. | 364/551.01 |
| 5,272,647 | 12/1993 | Hayes | 364/551.01 |
| 5,320,123 | 6/1994 | Corso et al. | 137/1 |
| 5,425,270 | 6/1995 | McDonald et al. | 73/168 |
| 5,451,923 | 9/1995 | Seberger et al. | 340/310.06 |
| 5,555,171 | 9/1996 | Sonehara et al. | 364/424.03 |
| 5,557,546 | 9/1996 | Fukai et al. | 364/551.01 |
| 5,586,305 | 12/1996 | Eidson et al. | 364/551.01 |

FOREIGN PATENT DOCUMENTS 0 315 391  5/1989  European Pat. Off. .

OTHER PUBLICATIONS

Pp. 488–492 and 528–531 from book entitled "Adaptive Control System" by R. Isermann, Karl–Heinz Lachmann and D. Matko, published by Prentice Hall 1992.

*Primary Examiner*—Emanuel T. Voeltz
*Assistant Examiner*—Hien Vo
*Attorney, Agent, or Firm*—Kinney & Lange, P.A.

[57] ABSTRACT

Data samples are obtained from a control device while in use to control a material process. Selected ones of these samples are stored which represent results of operating the device over portions of its characteristics, and they are selectively combined to provide an indication of the complete device characteristics. Selected such data samples are used provide information concerning selected control device parameters based on the device characteristics.

18 Claims, 8 Drawing Sheets

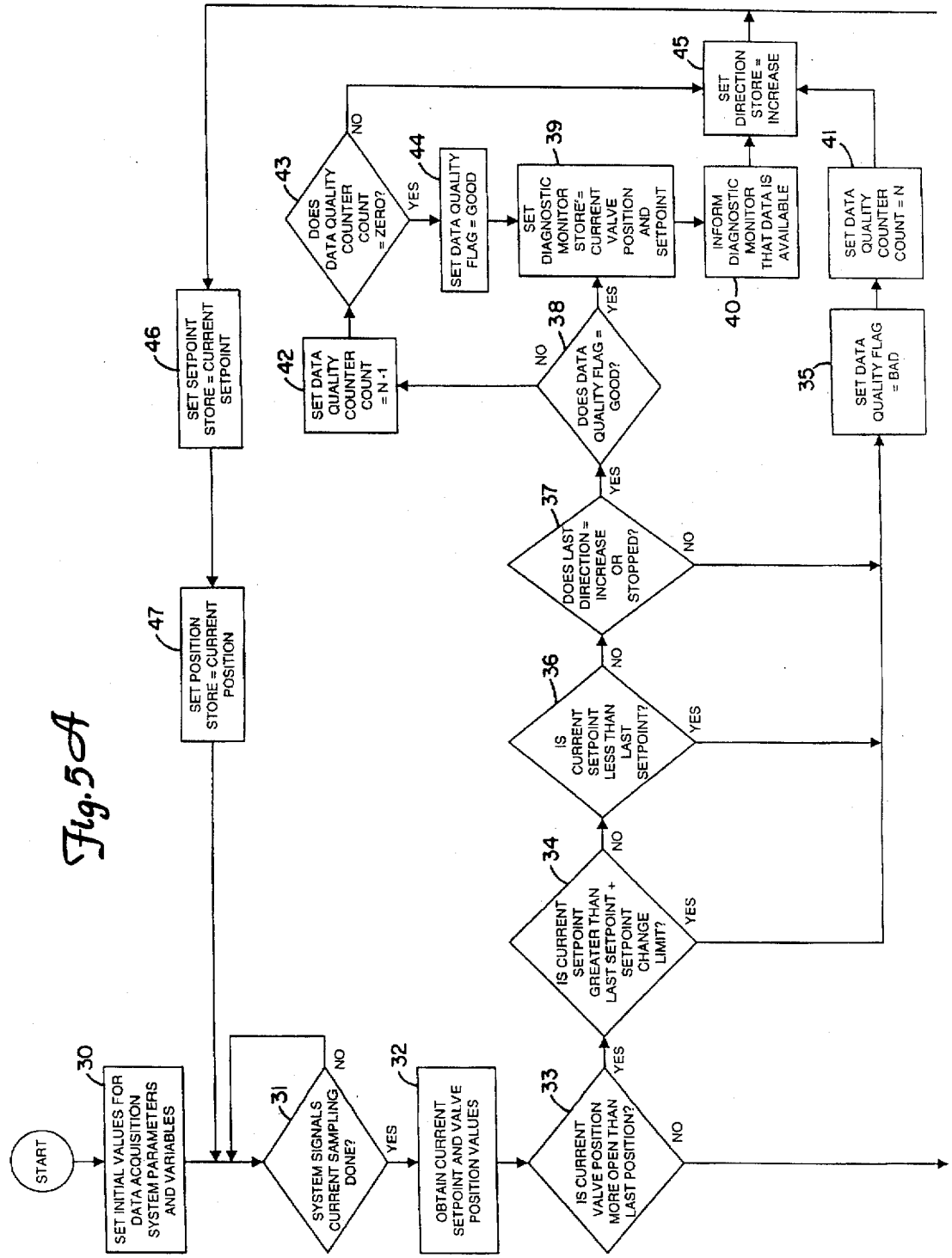

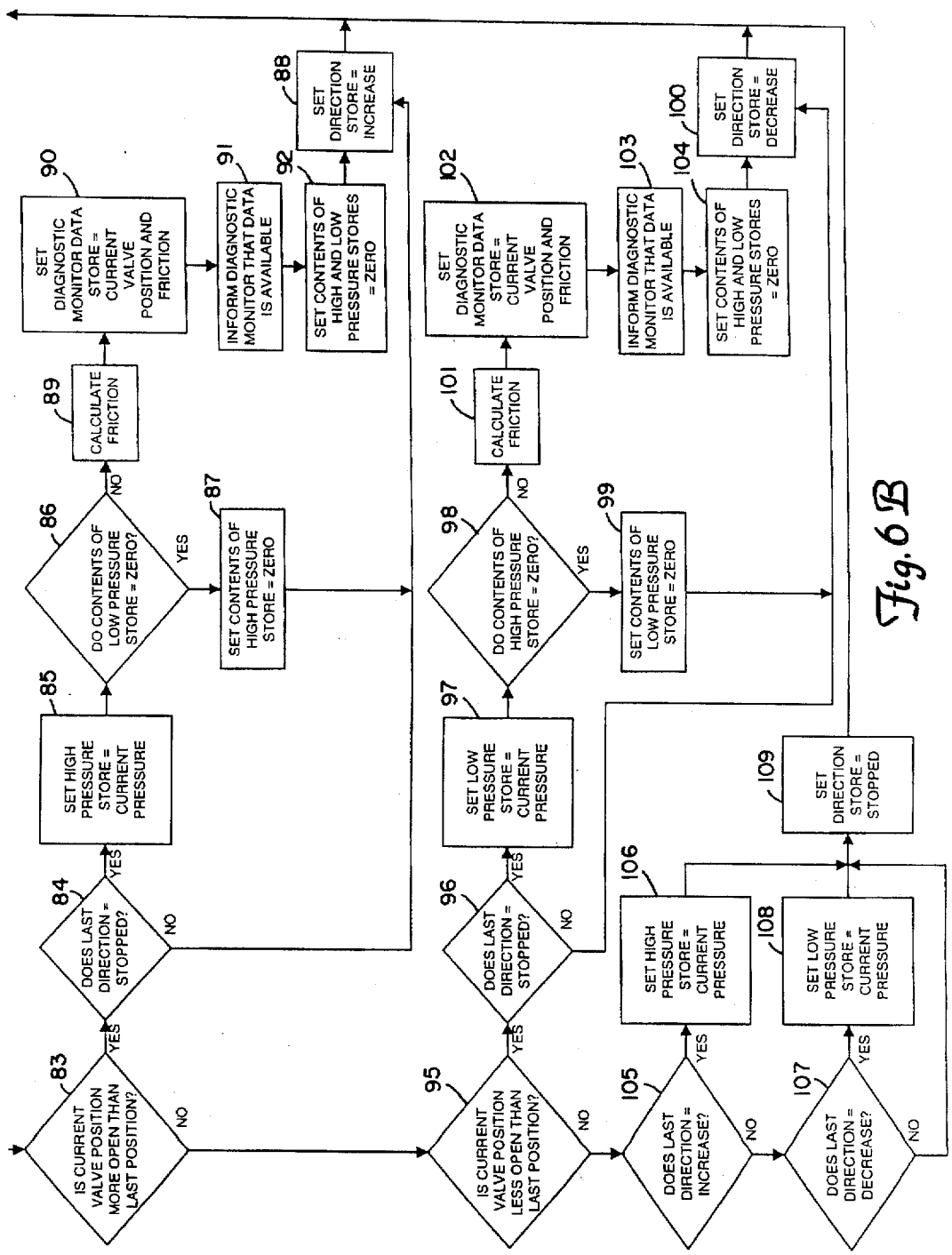

DEVICE DATA ACQUISITION

BACKGROUND OF THE INVENTION

The present invention relates to obtaining data from devices controlling material processes and, more particularly, to obtaining data from such devices during normal operation thereof in controlling such processes.

Many industrial processes involve transporting materials in various kinds of conduits, and various kinds of control devices are used in such conduits to control such passage of material. Typically, such control devices have a control element therein which may be a valve plug, a damper or some other alterable opening means. These devices are positioned in conduits to control the passages of materials therethrough by having a control element alterable by an attached actuator and positioner. Such adjustments to the control element are used to adjust some process condition such as the flow of a fluid material to maintain a selected flow rate, pressure, fluid level, temperature, etc. A typical actuator is operated by a positioner of an appropriate sort to control the energy applied thereto to result in the actuator being capable of selectively positioning the actuator output mechanism which may, for instance, be a) a valve stem capable of linear translation connected to the valve element and typically driven by i) varying fluid pressure on a diaphragm and a spring connected thereto, or by ii) varying fluid pressure on either side of a piston connected thereto, or alternatively may be b) a rotor shaft capable of rotational translation connected to the valve element and typically driven by i) either of the drive elements just set out along with a rotary motion converter connected thereto, or by ii) fluid pressure on either side of a rotatable vane connected thereto, or in a further alternative may be c) an electrical actuation arrangement.

A combination of the control element, actuator and positioner forms a control valve in the instance that the control element is a valve element, and the operation thereof is often powered from a regulated source of pneumatic fluid pressure. This fluid pressure is introduced into a pressure chamber, partly enclosed by a diaphragm, under the control of a positioner or instrument which sets the amount of fluid pressure in the chamber at any time, and so the deflection of the diaphragm, in response to control signals supplied thereto through a pair of electrical conductors attached thereto. The signals on these conductors from a remote control source typically supply information to the instrument, or positioner, in the form of varying magnitudes of a direct current supplied through these conductors formed in a current loop which magnitudes vary in the range of 4 to 20 ma, and this control current also may be accompanied by further digital signals in a well known manner. Also, the positioner or instrument can in many instances transfer information to the remote source by the use of such signals. Of course, such control and information signals can be provided instead in the form of all digital signals.

The magnitude of the fluid pressure in the pressure chamber determines the deflection of the diaphragm thereby controlling the position of the actuator valve stem coupled to that diaphragm and to the valve element, and further coupled to a bias spring. The diaphragm must work against this spring, to set the valve element opening between the inlet and the outlet of the control valve where it is coupled to the inlet and outlet conduits used in connecting the control valve into the processing plant. The actuator can be designed so that increasing fluid pressure in the pressure chamber either increases the extent of the valve element opening or decreases it, the former situation being assumed herein. Typically, also, a feedback signal is developed for the positioner or instrument, either a signal based on a) the position of the valve element and so on the extent of the valve opening available to material flow, this position usually being measured by the actuator stem position or the valve stem position, or on b) a signal based on the pressure occurring in the actuator pressure chamber for deflecting the diaphragm.

A well known aspect of control valves is that the valve element therein is subject to friction, that is, a requirement that a force differential must be applied against the valve element before the valve can change its direction of travel (either from having been increasing its opening to then closing to some degree, or vice versa) from the direction of travel last followed. This characteristic is generally attributed to some circumstance of friction between the parts of the valve element and its housing and the actuator which are to move relative to one another. This aspect is revealed by the characteristic loop found if the valve element position (determining the extent of the valve element opening controlled thereby), taken as an output variable, is plotted against some input variable such as the setpoint signal forming the input signal command to the valve positioner or, alternatively, against other inputs such as the valve positioner output signal or the chamber pressure acting on the diaphragm. The combination of the valve and valve actuator, and of the positioner, valve and valve actuator, result in characteristic loops due to the effects of friction, hysteresis, dead band, etc. Many of the variables encountered can be plotted against one another to result in these characteristic loops such as the input command signal versus various positioner internal signals or the pressure introduced into the actuator pressure chamber.

The nature of a characteristic loop in an input-output characteristic for a particular control valve is often established by the manufacturer through testing. However, once the control valve is installed by a user in the processing plant, the obtaining of a full characteristic loop for such a control valve often requires shutting down at least that portion of the processing plant in which the control valve is located or by providing a bypass for such a control valve using other suitable valves to enable the performing of such tests. The consequences of shutting even a portion of a processing plant are often such that any such obtaining of characteristic curve data for a control valve is foregone.

This is unfortunate, because the nature of the characteristic loop for a control valve, and other control devices exhibiting such characteristic loops, is usually quite informative as to the nature of the condition of the control valve and, oftentimes, as to the condition of the process being controlled. That is, information can be obtained from the input-output characteristic loop of such a control valve which indicates the friction exhibited by that valve, the spring rate in the bias spring, the seating of the valve, the behavior of the actuator, etc. In addition, if the characteristic loop can be regularly measured for a control valve, the trends over time in some of these parameters can also be obtained which can be very useful in analyzing the performance of the process over time such as by noting the friction the valve exhibits versus the valve position over time, the friction the valve exhibits versus the measured process control variable, and the like, and in predicting the future performance of the control valve itself. Thus, there is a desire to obtain ongoing information as to the relationship of the input and output parameters of a control valve or other control device exhibiting a characteristic loop during use in controlling a material process with which it is being used.

SUMMARY OF THE INVENTION

The present invention provides for obtaining data characterizing control devices used in controlling material processes during such controlling by obtaining samples of various input and output signals associated with the device and the process. Selected ones of these data samples are stored and represent the operating experience of the control device over various parts of its characteristics during its control operations, those data samples representing the various portions of the such characteristics being selectively combined to provide an indication of the full device characteristics. In addition, these selected data samples are used provide information concerning selected control device parameters based on the device characteristics.

BRIEF DESCRIPTION OF THE DRAWINGS

FIGS. 5A and 5B show a flow chart used in connection with the system of FIG. 1; and FIGS. 6A and 6B show a farther flow chart used in connection with the system of FIG. 1.

DETAILED DESCRIPTION OF THE PREFERRED EMBODIMENTS

Figure 1:
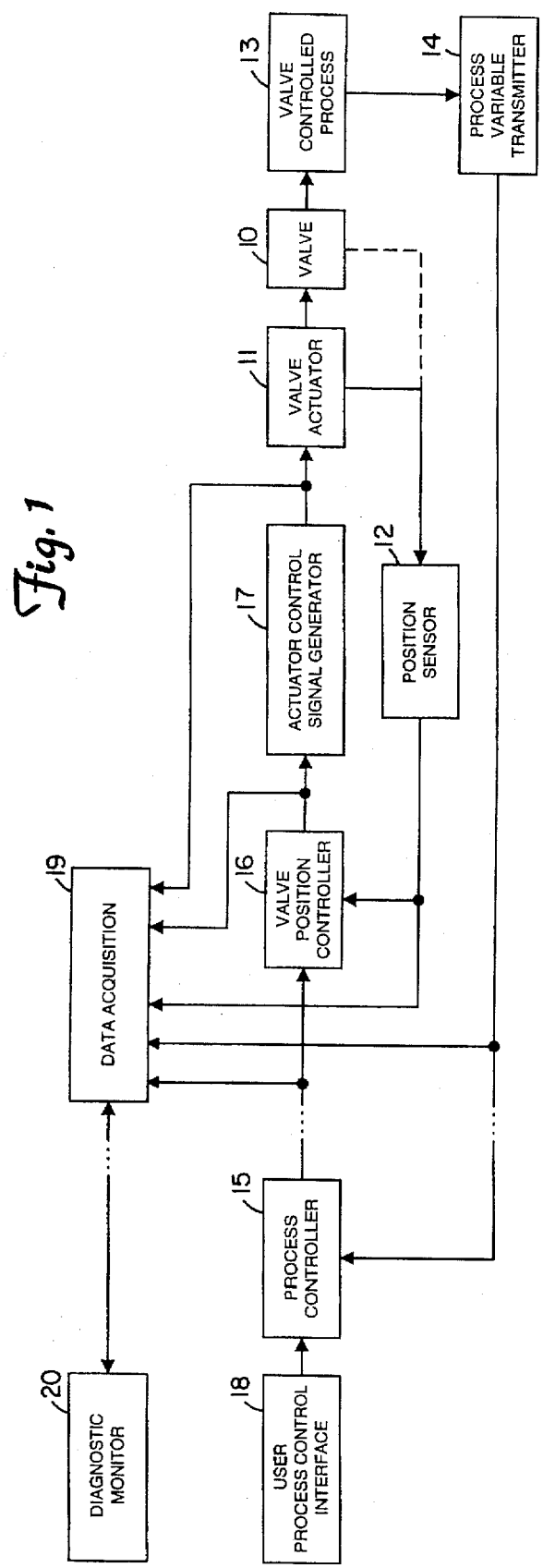
FIG. 1 shows in block diagram form a control system embodying the present invention.

Turning to the block diagram of FIG. 1, a valve, 10, has a moveable element therein located adjacent the alterable extent flow opening it controls (valve element 10 herein) which is selectively positioned by a valve actuator, 11, and an indication of the position achieved by that valve element is provided through a position sensor, 12. Valve element 10 is used to control passages of materials in a material process, 13, of an arbitrary nature. Some variable characterizing this process is sensed in a process variable transmitter, 14, and its value is transmitted back to a process controller, 15, directing operation of the process plant to control the process.

The output of position sensor 12 is supplied to the valve positioner formed by a valve position controller, 16, operated under the direction of a microcomputer provided therein, and an actuator control signal generator, 17, which receives an output signal from controller 16 as its input. Actuator control signal generator 17 converts the output signal from valve position controller 16 to the corresponding pressure value to be established in the pressure chamber of valve actuator 11 as an input to that actuator, this pressure chamber being formed in part by a diaphragm used to operate the actuator valve stem of valve actuator 11. Note that position sensor 12 has a solid line input in FIG. 1 from valve actuator 11 indicating that the position input information is taken from the position of the valve actuator stem. Alternatively, there is shown in a part dashed line and part solid line input to position sensor 12 from valve 10 indicating that the position of valve element 10, as detected from the position of the valve stem, can alternatively serve as the measured output variable.

In operation, a user interacts with the control valve and process 13 at a user process control interface, 18, which is employed by the user to provide commands to process controller 15 responsible for the control of the entire process 13 in support of which process controller 15 is in communication with other control devices used in the plant for process 13 but not shown in FIG. 1. Process controller 15 translates the input commands supplied by the user at interface 18 and sends them along, typically over a 4 to 20 ma current loop, as "setpoint" signal commands to valve position controller 16. Valve position controller 16 has therein the microcomputer described above which is programmed to follow an algorithm for controlling valve actuator 11 in response to setpoint signal commands through properly generating a signal for this purpose for provision to actuator control signal generator 17 to generate a corresponding pneumatic pressure in the actuator pressure chamber for positioning the valve stem.

In the system of FIG. 1, increases in magnitudes of the setpoint commands, as increases in current magnitudes in the 4 to 20 ma current loop assumed to be connecting process controller 15 with valve position controller 16, are taken as causing corresponding increases in the pneumatic pressure provided by actuator control signal generator 17 in the pressure chamber of the actuator, and thereby causing corresponding increases in the opening controlled by valve element 10. The resulting positioning of valve element 10 has an effect on process 13 to result in affecting that variable selected for transducing by process variable transmitter 14 to provide an electrical signal for transmitting back to process controller 15 carrying information as to the measured of the status of that process variable, and so an indication of the status of process 13 under the control of process controller 15.

Figure 2:
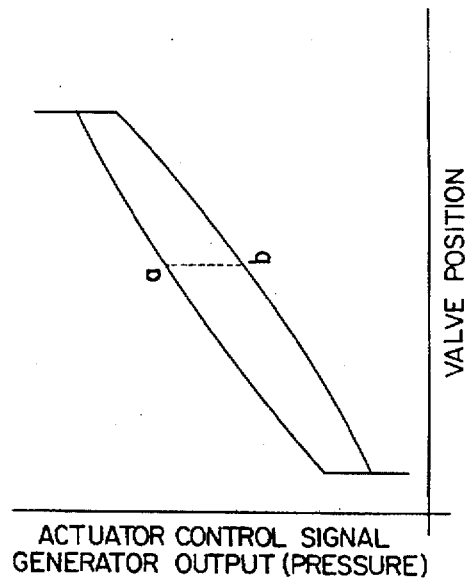
FIG. 2 shows a representative characteristic of a control device used in the system of FIG. 1.

The control valve of the system of FIG. 1 including valve element 10 exhibits, as described above, relationships involving characteristic loops between its output variable, valve position, over its full magnitude range and any of its input variables, such as a the setpoint command signal over its corresponding range provided by process controller 15 to valve position controller 16, over corresponding magnitude ranges. An example of such a relationship is shown in FIG. 2 where the full magnitude range input-output characteristic for setpoint command signal magnitudes versus valve position can be seen to saturate at the extremes of the valve position and to follow a closed characteristic loop at other positions and command signal magnitudes. Alternatively, the output of actuator control signal generator 17, fluid pressure in the actuator pressure chamber having therein the diaphragm operating the valve stem, can be plotted over a corresponding magnitude range as the input variable against the position of valve element 10 over its full range as the output variable as shown another example in FIG. 3. (The valve position is plotted in FIG. 3 along the axis opposite that along which it was plotted in FIG. 2.) Again as can be seen, this full magnitude range input-output characteristic exhibits a characteristic loop relationship.

Figure 3:
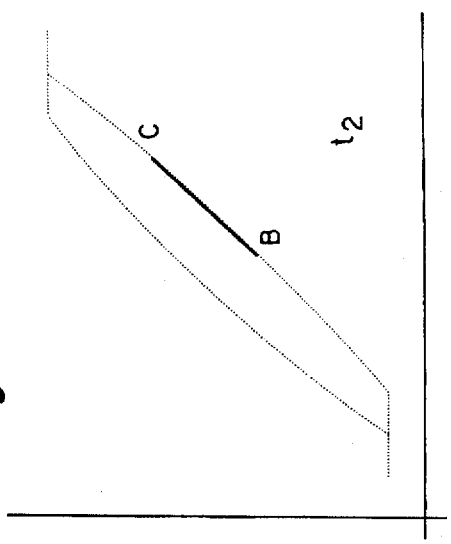
FIG. 3 shows an alternative representative characteristic of a control device used in the system of FIG. 1.

These input-output characteristic loop curves for the control valve of FIG. 1 showing the relationship between the output variable, valve position, and the alternative input variables, either the setpoint command signal as plotted in FIG. 2 or the actuator control signal generator output (pressure) plotted in FIG. 3, show the relationships involved between these control valve input and output variables over the complete magnitude range for the valve position and the corresponding pertinent full ranges for the alternative input variables. However, in practice, the commands from process controller 15 directing the positioning of valve element 10 typically do not regularly or cyclically force that valve element over every position shown on the characteristics of FIGS. 2 and 3, and they may not ever force a complete a full cycle around the entire characteristic during normal on-line operation of the control valve in connection with the controlling of at least a part of process 13. Such full magnitude range traversal behavior over the input-output characteristic of the control valve is, in many processes, only likely to occur during special testing of the control valve using testing commands designed to result in such behavior of valve element 10 which is usually incompatible with the continual operation of process 13.

Since the commands provided by process controller 15 in on-line operation are dictated by the inputs from user process control interface 18 and from process variable transmitter 14, along with the control algorithms programmed therein, the path about the input-output characteristic actually followed by the input and output variables tends to be traversals over portions of a series of minor characteristic loops overlaying portions of the full range relationship characteristic loop shown in FIG. 2 and 3. That is, this on-line operation path for the control valve in many instances tends to have monotonic segments therein over some portion of one side of the full range input-output characteristic loop (which segments do not necessarily represent continual movement in time), then pass through the dead zone perpendicular to the valve position axis between the two sides of the full range characteristic loop where there is no valve element movement because of a command to reverse the valve element travel direction, and then begin moving monotonically in the opposite direction (which movement again may well not be continual in time).

This situation is illustrated in FIG. 4 in portions 4A through 4H where a series of valve element travel responses to a corresponding series of setpoint signal commands for the position of valve element 10 are shown overlaying a dashed line representation of the full magnitude range input-output characteristic loop of FIG. 2. The axis labels in FIG. 4 have been omitted but the axes labels are the same as those shown for the corresponding axes in FIG. 2. In addition, a time value is listed in each portion of FIG. 4 representing the time at which the positional response of valve element 10 shown in that portion, made in response to corresponding setpoint signal commands, has been completed. Further, the initial and final points corresponding to the position of valve element 10 before the imposition of the next setpoint command, and the position reached by the element at the completion of its response to that setpoint command, are given alphabetic designations using capital letters in the various portions of FIG. 4. Also, such letters have been added at the transition point positions traversed by the valve element in going from a dead zone to a active movement portion of the characteristic.

Figure 4A:
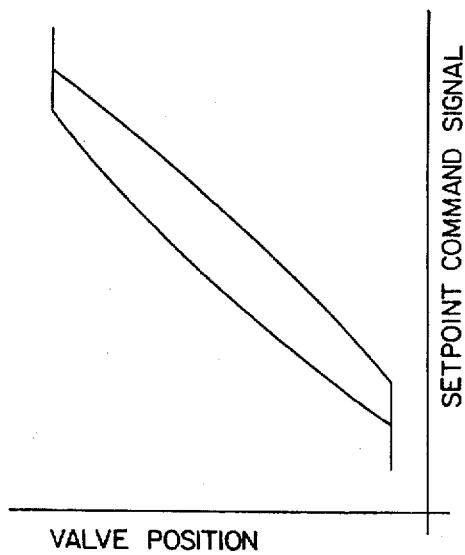
FIGS. 4A, 4B, 4C, 4D, 4E, 4F, 4G and 4H show characteristics representative of the control device used in the system of FIG. 1.

In FIG. 4A, process controller 15 has directed valve element 10 to increase further the opening which it controls, starting from the position at the point marked A on the input-output characteristic loop, the controller increasing the setpoint command signal magnitude to force valve element 10 to move monotonically in increasing the opening to finish at point B at time $t_1$ in this figure. A further increase opening command from process controller 15 has resulted in a further response by valve element 10 in FIG. 4B to increase the opening beginning from point B, repeated in this figure, and continuing to travel monotonically onward in increasing the opening to reach point C on the characteristic at time $t_2$.

Figure 4B:
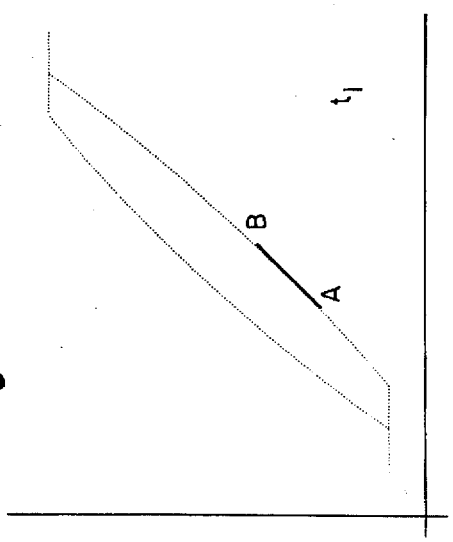
Figure 4C:
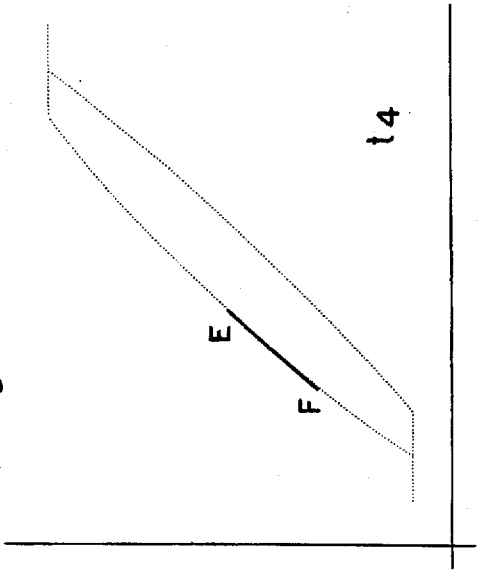

In FIG. 4C, process controller 15 has commanded valve element 10 to now close the opening it controls somewhat from the position it had at point C in FIG. 4B, that is, to cease its monotonic movement in a direction that increases that opening at a point well short of the travel required to achieve the maximum possible opening and, instead, to begin moving in the opposite direction. However, because of friction, the setpoint command signal magnitude must decrease significantly from the value it had at point C in FIG. 4B (this point shown again in FIG. 4C) to thus cross the dead zone where no valve element travel occurs and to reach the value shown at point D before valve element 10 begins to move in the opposite direction to thereby begin closing the opening it controls. A further decrease in the magnitude of the setpoint command signal subsequently moves valve element 10 monotonically in this opposite direction to reduce this opening to reach point E at time $t_3$. Thereafter, process controller 15 has commanded a further closure of valve element 10 through reducing its setpoint command magnitude which is shown in FIG. 4D in the traversal of valve element 10 monotonically from point E down to point F which is reached at $t_4$.

Figure 4D:
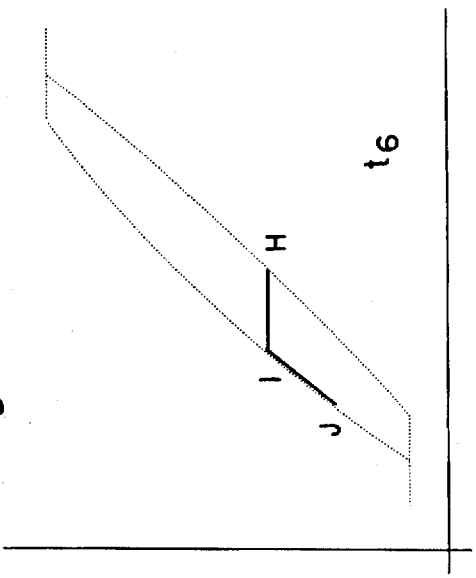
Figure 4E:
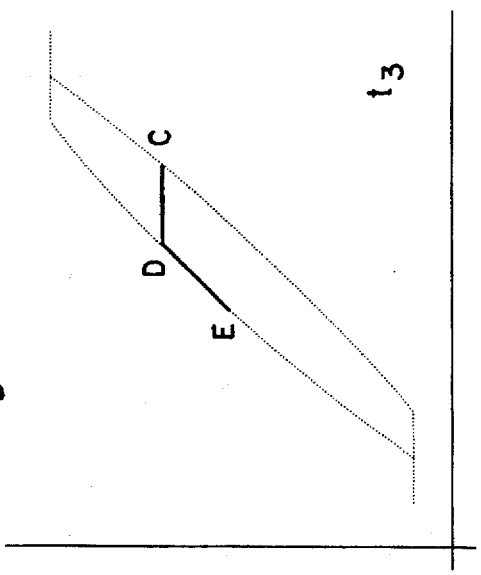

At the position of valve element 10 represented by point F in FIG. 4D, which point is repeated in FIG. 4E, process controller 15 has again ordered a reversal in the travel direction of valve element 10 directing it to increase its opening, that is, to cease its monotonic movement in a direction that decreases the opening it controls at a point well short of the travel needed to fully close this opening and, instead, begin moving in the opposite direction. Again, however, due to friction, a substantial increase in the setpoint command signal magnitude to cross the dead zone where there is no valve element movement is required to cause valve element 10 to move, a magnitude which must reach the value shown at point G before valve element 10 begins to increase the opening it controls. Further increases in the setpoint command signal magnitude have resulted in valve element 10 moving monotonically to reach the value shown at point H at time $t_5$. As a result, valve element 10 in FIGS. 4A through 4E has substantially traversed a minor characteristic loop within, and overlapping parts of, the full characteristic loop in the input-output characteristic of FIG. 2. Quite often, of course, a full minor loop traversal will not occur during operation because of valve element travel commands causing the element to change its travel direction before a minor loop is completely traversed.

Figure 4F:
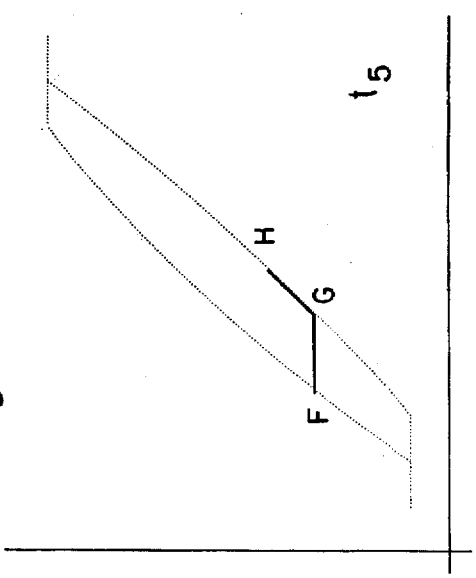

At point H, shown again in FIG. 4F, process controller 15 has again directed valve element 10 to reverse its direction of travel. Again, because of friction, a substantial decrease in the setpoint command signal magnitude to reach point I is required to get valve element 10 moving in the opposite direction. Clearly, valve element 10 is traversing about a much smaller minor loop in the path traversal shown in FIGS. 4E and 4F than the loop traversed in FIGS. 4A, 4B, 4C, 4D and 4E. Once the setpoint command signal has fallen to the value shown at point I in FIG. 4F, further reductions in that signal cause valve element 10 to monotonically decrease the opening it controls to reach point J at time $t_6$.

Figure 4H:
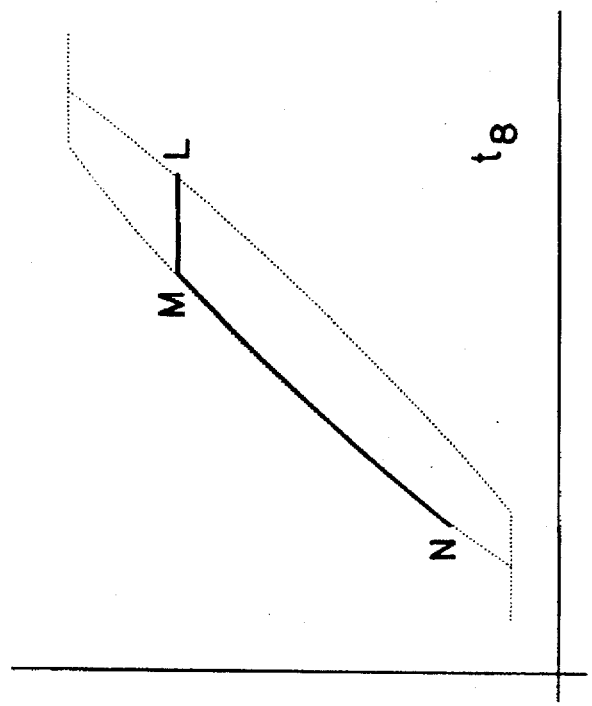
Figure 4G:
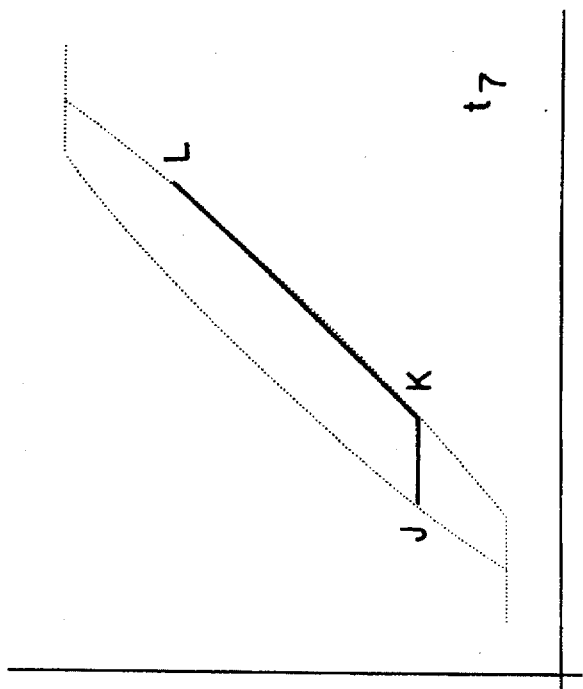

Two further reversals in valve travel direction that have been commanded by process controller 15 are shown in FIGS. 4G and 4H leading to the traversal by valve element 10 of, or partial traversal of, a much larger minor characteristic loop. The setpoint command signal magnitude, in increasing from point J across the dead zone to point K, begins to cause valve element 10 to move to increase the opening controlled thereby with further increases forcing valve element 10 to move monotonically to reach point L at time $t_7$. Traverse of this larger minor loop is substantially completed in FIG. 4H with the magnitude of the setpoint command signal decreasing from point L across the dead zone to point M, and then further decreasing in magnitude to force valve element 10 to monotonically move to reduce the opening it controls and reaching point N at time $t_8$.

As can be seen, a further portion of the full range characteristic loop in the input-output characteristic of FIG. 2 is encountered in the traversal, or partial traversal, of this last minor loop over the portion of that characteristic encountered in the traversal, or partial traversal, of the first described minor loop in FIGS. 4A through 4E. Such a path of operation over the input-output characteristic loop for the control valve in the system of FIG. 1 continues to evolve over time in this manner during the controlling of process 13, perhaps with greater or smaller monotonic path segments depending on the nature of the process and control algorithms used, factors which will also affect the time frequency of such valve element path reversals.

That is, as the dictates of both the user through user process control interface 18 and the process variable conditions found by transmitter 14 direct, process controller 15 will continue to issue commands to further open and close valve element 10. In some processes, these commands to change position will come relatively often, whether in making large valve position changes or small position changes. In other processes, the changes will be infrequent whether for large valve position changes or small ones. Some processes will result in relatively small excursions in valve position over time whereas in others the excursions will be large. In most processes, however, excursions of the operation path over the entire input-output characteristic loop in a relatively short time will be relatively rare. Yet, as indicated above, there is substantial value to the user to have reasonably current knowledge of the input-output characteristic loop of the device being used to control process 13, here in FIG. 1 the control valve.

Such knowledge as current as the operation control path permits can be obtained during on-line controlling operations by accumulating the experience of valve element 10 in following its operation path over the various portions of a series of minor loops it traverses under the commands of process controller 15 over time. Then the data gathered at different points in the various traversals of the series of minor loops occurring at different times can be combined from enough of the minor loop segment traversals to cover the full range major loop to thereby allow presenting a representation of the input-output characteristic loop for the control valve but with different portions of it measured at different times relative to other portions.

Over sufficiently long times, the user can group the various measurement data by time bands to allow presenting to the user a series of time accumulated input-output characteristic loop representations so that a user may see the evolving trends of that input-output characteristic over time. Similarly, the user can select data that is only within a certain magnitude range of the input and output variables so that a specific portion of the full range input-output characteristic loop can be studied, i.e. in effect be able to "zoom" in on the portion of that characteristic of interest which portion, again, can be shown evolving over time. Thus, the user will be able to correlate in time events and trends in process 13 with events and trends in the input-output characteristics of the devices used to control that process, particularly if presented with the contemporaneous data obtained for the measured process variable by process variable transmitter 14. In addition, of course, the parameters of the control device associated with the full range input-output characteristic loop can be to a significant extent monitored on the basis of such data to determine trends in the parameter values of the device and its behavior. Also, changes in device parameter values or behavior can be correlated with certain other device parameters such as, for instance, the friction determined for the control valve as a function of the position of valve element 10.

These capabilities are provided for the system shown in FIG. 1 by the use of a data acquisition system, 19, operated under the control of a microcomputer, and coupled to various signals in the system of FIG. 1 and to signals provided by sensors used to sense physical variables in the system of FIG. 1 which would otherwise not be measured except for these diagnostic purposes. Thus, data acquisition system 19 receives the setpoint command signal from process controller 15 which is also provided to valve position controller 16. The output signal of valve position controller 16 provided to actuator control signal generator 17 is also obtained by data acquisition system 19, as is the pressure generated by actuator control signal generator 17 for operating valve actuator 11. Thus, data acquisition means 19 is shown in FIG. 1 to acquire three input variables for the control valve control system shown there, but could gather data from more or fewer signals or parameters in the system of FIG. 1 or in a system controlling another kind of process control device. Data acquisition system 19 also gathers output variable data which, in FIG. 1, is shown to be the valve position signal provided by position sensor 12 to valve position controller 16, and the signal representing the process variable provided by processor variable transmitter 14 to process controller 15. Here, too, data acquisition system 19 could gather data from more or fewer output variables, and may well do so in connection with a control system for another kind of process control device.

Data acquisition system 19 includes those sensors necessary to convert physical variables, such as the pressure generated by generator 17 to operate valve actuator 11, into an electrical signal. In addition, data acquisition means 19 contains the analog-to-digital converters necessary to convert the analog signals gathered thereby into equivalent digital signal representations by periodically sampling them at a rate sufficient to represent them with enough accuracy to provide data usable by the user.

The data acquired by data acquisition system 19 is then made available to a diagnostic monitor, 20, typically a computer. A user may use diagnostic monitor 20 to manipulate the data, or parts of that data perhaps segregated by time or magnitude, that has been acquired by data acquisition system 19. Diagnostic monitor 20 can use this data to display, by use of graphical plots, tabular listings, or the like, based on that data, indicators of the relationships between control system variables, and to display related signal and parameter values, trends, correlations, etc. which are of interest to the user. Diagnostic monitor 20may also perform preparatory manipulations on such data before such displaying such as statistical processing, filtering, etc.

FIG. 5 in portions 5A and 5B show a flowchart indicating the primary steps followed by data acquisition system 19 in obtaining selected data from the control valve in the control system shown in FIG. 1, and from that system, during times that the control valve and system are controlling a corresponding portion of process 13. Data acquisition system 19, in being a digital system, operates by repeatedly acquiring samples of the magnitudes of the analog signals supplied thereto through the use of analog-to-digital converters to thus obtain a succession of sets over time of contemporaneously acquired data points, one for each analog signal supplied thereto. The sequences of values across these sets corresponding to each of these analog signals provide digital representations of these signals over time as the basis for operations performed in connection with these signals in that system.

The flow chart of FIG. 5 sets out the main operations performed by system 19 on this succession of sample data point sets to obtain such selected data from the control valve and the control system. These operations are undertaken by system 19 to determine whether contemporaneously obtained magnitude values from the setpoint command signal and the signal representing the position of valve element 10, which form the contemporaneous data point sets in a succession thereof, are suitable data points for use in representing points on the current input-output characteristic loop of FIG. 2 for the control valve in the system of FIG. 1 which characteristic is to be constructed from only data representing steady motion in which friction effects will dominate. Beginning from the "START" balloon in FIG. 5A, system 19 first sets initial values used therein for the system parameters and for the operating variables used in connection with the FIG. 5 operation as is indicated in a box, 30. Thereafter, system 19 determines whether the taking of set of current data samples from the analog signals supplied thereto has been completed in a decision diamond, 31, the system waiting until such sampling is done as indicated by the feedback loop directed back to the start of this decision diamond when such sampling is incomplete. Following the completion of the current sampling of pertinent signals, system 19 obtains current values from the current set of data concerning current analog signal magnitude sample values for the setpoint command signal magnitude and the magnitude of the signal representing the position of valve element 10 as indicated in a further block, 32.

System 19 first tests whether the current valve position signal magnitude value indicates that valve element 10 has traveled so as to increase the opening it controls beyond the extent it was found to be open in the preceding sampling in a further decision diamond, 33. If so, valve element 10 is detected to be moving in a direction to increase the opening it controls. In this situation of having detected movement of valve element 10 in a direction to increase the opening it controls, the current setpoint command signal magnitude value is tested in a further decision diamond, 34, to determine whether it represents a magnitude increase that is greater than the setpoint command signal magnitude value found in the last sampling by more than a setpoint change limit factor having a value selectable by the user.

This test is undertaken to eliminate from the data used to determine the current input-output characteristic loop for the control valve those contemporaneously taken setpoint command signal and valve position data points in which the setpoint command increment is so large as to cause a relatively large pressure increase in the actuator pressure chamber operating the diaphragm to move valve element 10. In these circumstances, relatively strong inertial forces are present on valve element 10, in addition to the steady motion frictional forces occurring in normal movement of valve element 10 in the absence of impulsive forces thereon, but only the frictional forces are sought to be represented in the input-output characteristic loop of FIG. 2. Thus, were such currently obtained data for the setpoint command signal and valve position used in such circumstances, there would be used data which represented conditions other than those sought to be represented in this kind of characteristic, and so such data is discarded and not used. This decision is indicated in decision diamond 34 by directing operation therefrom to a box, 35, below and to the right of decision diamond 34 in which a data quality flag is set equal to "BAD" as a consequence.

If, on the other hand, the current setpoint command signal magnitude increase is not too great, the current setpoint command signal magnitude value is then further tested to see whether it is of a magnitude that is less than the magnitude of the stored setpoint command signal magnitude found in the previous sampling in another decision diamond, 36. The occurrence of such a condition for the setpoint command signal magnitude value would indicate that a command has been given which provides for an imminent reversal in the direction of travel of valve element 10 thereby indicating that the currently obtained data is or may not be representative of steady monotonic travel of that valve element. If this is found to be the circumstance, the data again is not used as seen by decision diamond 36 directing operation to box 35 below and to the right thereof to set the data quality flag to "BAD" as a consequence.

If the set point command signal magnitude is not indicating an imminent reversal in direction of travel of valve element 10, the stored direction of travel of valve element 10 found in the last sampling is checked in a further decision diamond, 37, to determine whether valve element 10 was either traveling in the same direction then as has been found in the current sampling (increasing the valve opening) or stopped. If not, the current data samples do not represent a part of a monotonic travel episode of valve element 10, and so these data samples are not kept as seen by decision diamond 37 directing operation to box 35 below and to the right thereof to set the data quality flag to "BAD" as a consequence.

If the current data is part of a monotonic travel episode of valve element 10, the data quality flag is checked in a further decision diamond, 38, as part of an arrangement determining whether the current data is obtained following the obtaining of a sufficient number of satisfactory data sets. If the data quality flag equals "GOOD", the current data set is accepted and the current setpoint command signal magnitude and the valve element position signal magnitude are stored in a diagnostic monitor store in system 19 as indicated in a box, 39, and the presence of suitable data is indicated to diagnostic monitor 20 in a further box, 40. With that notification, diagnostic monitor 20 has the opportunity to retrieve data concerning the control valve of the system of FIG. 1 at its convenience.

The occurrence of obtaining data which is unacceptable is, as has been noted above, memorialized by setting the data quality flag equal "BAD" in box 35. This in turn leads to setting a data quality counter with a count value "N", selectable by the user, in a further box, 41. This count value determines the number of satisfactory data sets which must have been previously obtained before a current data set is stored as acceptable data for retrieval by diagnostic monitor 20 once an unsuitable data set has been found. Thus, in decision diamond 38, if data quality flag is not equal "GOOD" but the current data set has been found satisfactory, the data quality counter count is decremented by one in another box, 42, and the resulting count in the data quality counter is thereafter checked in a decision diamond, 43, to determine whether that count has reached zero. If it has, the data quality flag is set to equal "GOOD" in another box, 44, and the current data set is accepted and the current setpoint command signal magnitude and the valve element position signal magnitude are stored as indicated in box 39.

If, however, the count in the data quality counter has not reached zero, the current data set is not kept, but the information that the current data set indicated that the valve element 10 was moving in a direction to increase the opening is stored in the direction store of system 19 by setting its contents equal to "INCREASE" in a further box, 45. This setting of the detected direction "INCREASE" is also done upon having found the current data set is acceptable after informing diagnostic monitor 20 that such data is available in coming out of box 40 to box 45, and after discarding the current data set as being unacceptable in coming out of box 35 to box 41, and then to box 45.

Once the direction store has been set to equal "INCREASE" in box 45, the current setpoint signal command magnitude value from the current data set is stored in the setpoint store of system 19 as indicated in another box, 46. Thereafter, the current valve position signal magnitude value in the current data set is stored in the position store of system 19 in a subsequent box, 47. Once this storing of the currently detected valve motion direction and the currently obtained set point command signal and valve position signal magnitude values is complete, system 19 returns to await completion of the next sampling of the analog signals supplied thereto as indicated by output of box 47 directing operation to return to a point just above decision diamond 31.

Figure 5B:
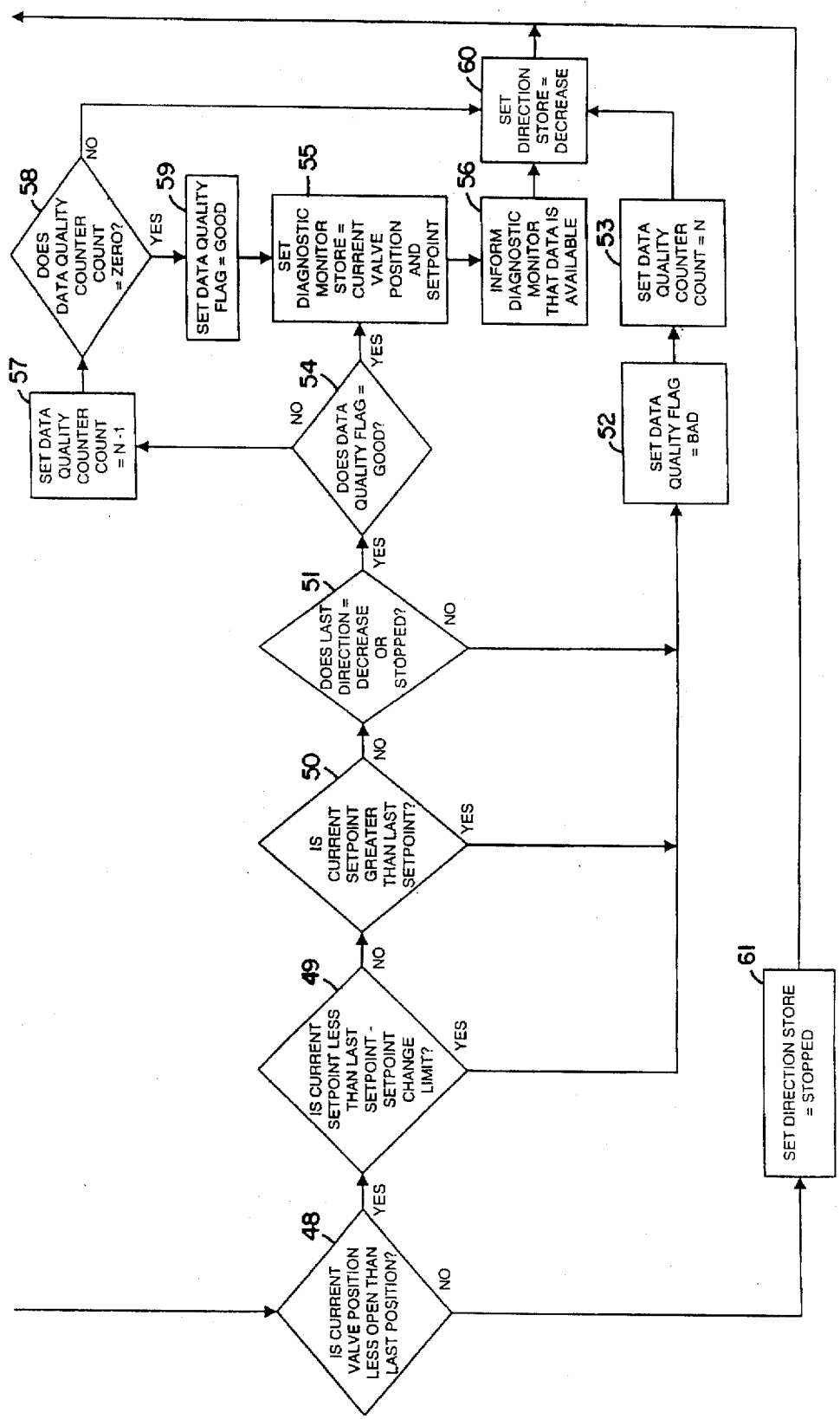

If, instead, in decision diamond 33 the position of valve element 10 is not found to be more open than it was in the preceding sampling, operation is directed by decision diamond 33 to a further decision diamond, 48, in FIG. 5B where the current data set is checked by system 19 in as to whether valve element 10 has traveled so as to decrease the opening it controls under the extent it was found to be open in the preceding sampling. If so, valve element 10 has been detected to be traveling in a direction to close the opening it controls, and this current data set is then subjected to the same battery of tests described above for the current data set in the situation in which the valve position has been detected as traveling in a direction to increase the opening that it controls.

Thus, system 19, in a decision diamond 49, determines whether the setpoint command signal magnitude has decreased from the magnitude it had in the last sampling by an amount greater than the set point change limit, selectable by the user as before. If not, in another decision diamond, 50, system 19 determines whether there is an imminent reversal in the direction of travel of valve element 10 because the current setpoint command signal magnitude is greater than that found in the last sampling. If not, system 19 in another decision diamond, 51, determines whether the indicated motion of valve element 10 is part of a monotonic travel episode. The failure of the current data set to pass these tests results again in each of these last three decision diamond directing operation to a box, 52, below and to the right of each in which a data quality flag is set to equal "BAD" followed by the setting of the data quality counter count to a value "N", again selectable by the user, as indicated in a further box, 53.

If, however, the current data set meet these tests of decision diamonds 49, 50 and 51, the data quality flag is checked in a decision diamond, 54. Acceptable data in connection with the data quality flag set equal to "GOOD" leads to the current data set being accepted and the current setpoint command signal magnitude and the valve element position signal magnitude are stored in the diagnostic monitor store as indicated in a block, 55, followed by informing diagnostic monitor 20 that such data is available in a further block, 56. An acceptable current data set in connection with the data quality flag being equal to "BAD" results in decrementing the data quality counter by one in a box, 57, and then determining whether the data quality counter count has reached zero in a decision diamond, 58. If that counter has reached a count value of zero, again the data quality flag is set equal to "GOOD" in a box, 59, which leads to again storing the current setpoint command signal magnitude and the valve element position signal magnitude in the diagnostic monitor store in box 55. If the data quality counter does not have a count value of zero, the current data set is not kept for diagnostic monitor 20, but the detected direction of travel of valve element 10 found in decision diamond 48 is stored in the direction store as "DECREASE" as indicated in block 60.

Again, finding acceptable data and storing it in the diagnostic monitor store is followed by storing the detected direction in the direction store as "DECREASE" in block 60 after informing diagnostic monitor 20 of the availability of good data in block 56. Also again, the occurrence of unacceptable data similarly leads to storing in the direction store the detected direction "DECREASE" as indicated in block 60 after the data quality counter count has been set to equal to "N" in block 53. As before, once the detected direction "DECREASE" has been stored in the direction store in block 60, the current setpoint command signal magnitude is stored in the setpoint store in block 46 and the current valve element 10 position signal magnitude is stored in the position store in block 47 with system 19 then returning to await the completion of the next sampling above decision diamond 31.

Finally, if the current data set does not indicate that the valve element 10 is moving to increase the opening it controls in decision diamond 33 or moving to decrease that opening in decision diamond 48, valve element 10 must not be moving. Thus, decision diamond 48 directs operation to a further and final block, 61, below and to the right thereof where this information concerning no movement of valve element 10 is stored in the direction store by setting the stored direction equal to "STOPPED" therein. Once the information that valve element 10 is not moving has been stored in the direction store in block 61, the current setpoint command signal magnitude is stored in the setpoint store in block 46, and the current valve position signal magnitude is stored in the position store in block 47 before system 19 returns to await the completion of the next sampling at a point above decision diamond 31.

Further operations are also undertaken by system 19 on the succession of data sets to determine whether the magnitude values therein for the setpoint command signal, the signal representing pressure developed by actuator control signal generator 17, and the signal representing the position of valve element 10 are suitable for representing the frictional forces acting on valve element 10 as they are exhibited between the extreme points of a dead zone in the current input-output characteristic loop of FIG. 3 for the control valve in the system of FIG. 1. The pressure differential represented by two points vertically opposite one another on opposite sides of the characteristic shown in FIG. 3 (where an example dead zone has been shown by a dashed line with two such points marked "a" and "b" also being shown at the opposite extremes of this dead zone example), multiplied by the effective area of the diaphragm in valve actuator 11, represent the force differential necessary to overcome the control valve friction to thereby permit forcing valve element 10 to change its direction of travel. FIG. 6 in portions 6A and 6B show the major steps followed by system 19 in finding this frictional force value at various positions of valve element 10.

Figure 6A:
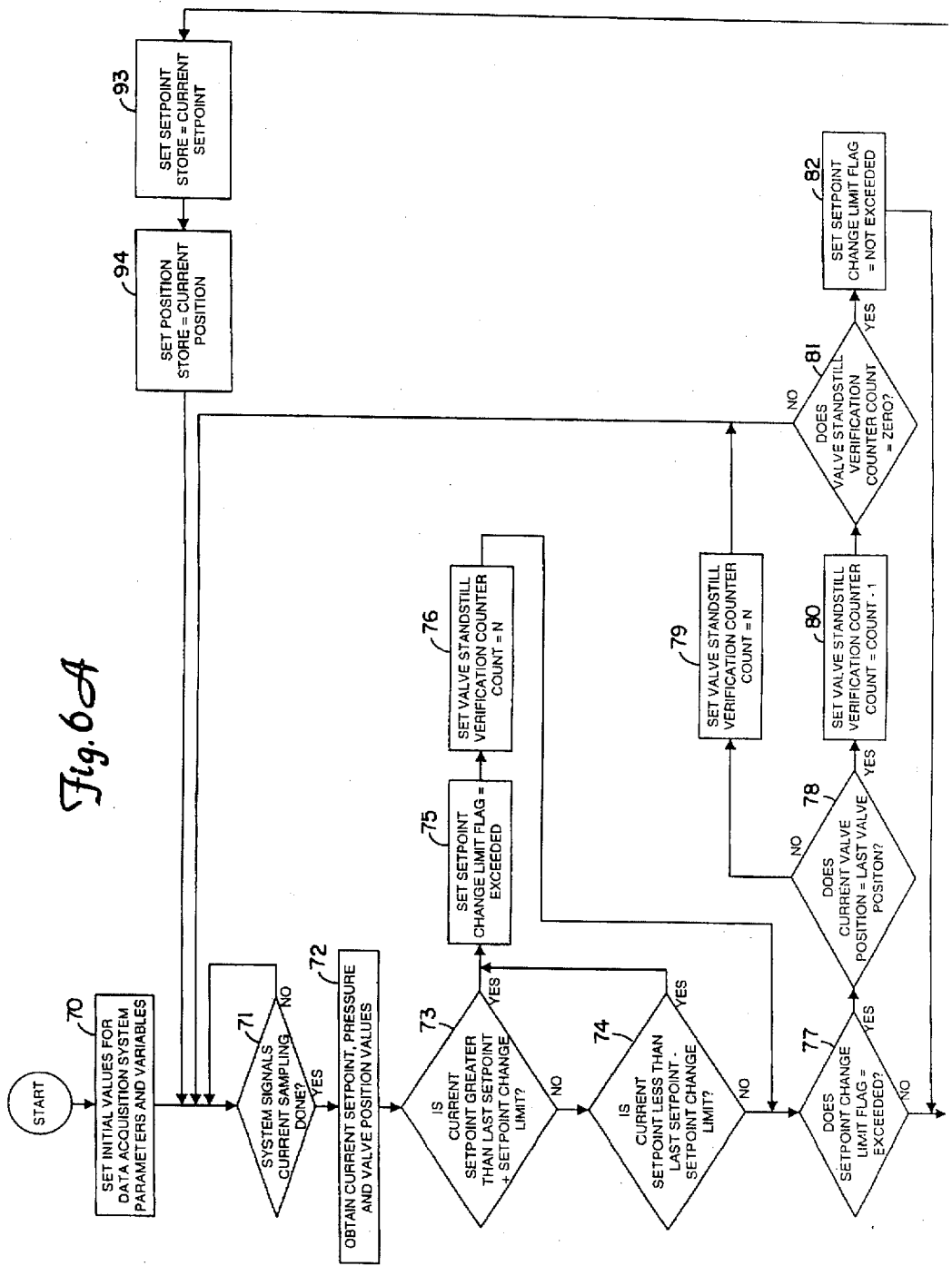

Again, following the "START" balloon in FIG. 6A, system 19 sets initial values used therein for the system parameters and for the operating variables for the FIG. 6 operation as is indicated in a box, 70. As before, system 19 then determines whether the taking of current samples from the analog signals supplied thereto has been completed in a decision diamond, 71, the system waiting until such sampling is complete as indicated by the feedback loop directed back to the input of this decision diamond when such sampling is incomplete. Also again, upon completion of sampling, system 19 obtains current values for the setpoint command signal magnitude, the pressure signal magnitude representing the pressure in the pressure chamber of valve actuator 11, and the position signal magnitude representing the position of valve element 10 as indicated in a further block, 72.

System 19 then tests the current data set in a further decision diamond, 73, to determine whether the current setpoint command signal magnitude value therein represents a magnitude increase that is greater than the setpoint command signal magnitude value found in the last sampling by more than a setpoint change limit factor, again having a value selectable by the user, and then, in a further decision diamond, 74, whether this current setpoint command signal magnitude represents a magnitude decrease that is less than the setpoint command signal magnitude value found in the last sampling by more than a setpoint change limit factor, again having a value selectable by the user. In either situation, if the current setpoint command signal magnitude change has gone beyond the corresponding setpoint change limit, a setpoint change limit flag is set to equal "EXCEEDED" in a box, 75. This is followed by setting a valve standstill verification counter to have a count equal to "N", selectable by the user, in the subsequent box, 76, after which system 19 is directed to operate at a point just past the setpoint change limit testing carried out in decision diamonds 73 and 74, the same point reached if the current setpoint command signal magnitude change has not gone beyond the corresponding setpoint change limit in either situation.

At that point, system 19 checks to see whether the setpoint change limit flag is set equal to "EXCEEDED" in a further decision diamond, 77. If the setpoint change limit flag is so set, system 19 checks in a further decision diamond, 78, whether the valve position signal magnitude data point in the current data set is equal to the valve position signal magnitude data point found in the last sampling to determine whether valve element 10 is in state of not moving or not. If valve element 10 has been moving, system 19 sets the valve standstill verification counter count again to equal "N" in a box, 79, and then awaits a new data set resulting from the next sampling as indicated by the arrow leading from box 79 back to a point just above decision diamond 71. In effect, system 19 resets itself to await a new data set if valve element 10 is not at a standstill after a setpoint command signal magnitude change exceeding the setpoint change limit.

If, however, system 19 finds valve element 10 to be at a standstill in decision diamond 78, the system decrements the valve standstill verification counter by one in another block, 80, and then checks whether this counter has reached a count value of zero in a further decision diamond, 81. If the count value of this counter has not reached zero, system 19 awaits a new data set resulting from the next sampling as indicated by the arrow going decision diamond 81 back to a point just above decision diamond 71. System 19 again in effect resets itself to await a new data set after a setpoint command signal magnitude change exceeding the setpoint change limit in the absence of a sufficiently long valve standstill time. On the other hand, if the valve standstill verification counter has a count equaling zero, system 19 causes the setpoint change limit flag to be set equal to "NOT EXCEEDED" in a box, 82, and, having found that valve element 10 has been at a standstill for a sufficiently long time, begins the next tests to determine whether valve element 10 has yet begun to move or remains stopped as set out in FIG. 6B. If the original check as to whether the setpoint change flag limit equals "EXCEEDED" in decision diamond 77 shows that such flag does not have that value, system 19 then proceeds directly to the tests in FIG. 6B concerning whether valve element 10 has begun to move or remains stopped.

In FIG. 6B, system 19 first checks in a decision diamond, 83, whether valve element 10 has traveled to a position that increases the opening controlled thereby over the extent of the opening which had been found to have been achieved in the previous sampling by comparing the valve position signal magnitude data point in the current data set with the valve position signal magnitude data point in the data set obtained in the previous sampling. If so, system 19 checks in a further decision diamond, 84, the direction store to see whether the direction stored therein in connection with the last sampling equals "STOPPED" or not. If so, the pressure signal magnitude data point from the current data set is stored by system 19 in the high pressure store therein as indicated in a box, 85, since the system has just verified that valve element 10 was stopped one sampling period ago and has now begun moving indicating that this pressure data point is indeed taken at one extreme end of a dead zone.

However, the frictional force cannot be calculated unless the low pressure value is known on the opposite side of the dead zone which would have been obtained just before the dead zone at the present position of valve element 10 was entered. Thus, system 19 checks to determine whether the contents of the low pressure store therein equal zero or not in a further decision diamond, 86. If the contents of the low pressure store are zero, thereby preventing determination of the frictional force, the contents of the high pressure store are also set to zero in a box, 87, to assure data not to be used is not stored to thereby risk inadvertent use in the future. System 19 thereafter directs that the direction store therein be set equal to "INCREASE" in a further box, 88, as was detected in decision diamond 83. Similarly, if system 19 found in decision diamond 84 that the direction stored in the direction store therein in connection with the last sampling does not equal "STOPPED" so that the current data set was not obtained at a dead zone extreme, system 19 thereafter directs that the direction store therein be set equal to "INCREASE" in box 88.

On the other hand, if the low pressure store contains a pressure value as determined in decision diamond 86, the frictional force is calculated as indicated in another box, 89. The result of this calculation and the valve position signal magnitude data point in the current data set are stored in the diagnostic monitor data store in system 19 as indicated in the subsequent data box, 90. Diagnostic monitor 20 is then informed of the availability of the data in a following box, 91, and thereafter the contents of the high and low pressure stores in system 19 are both set to zero in yet another box, 92. This leads to box 88 for setting the direction store in system 19 equal to "INCREASE" as was originally detected in decision diamond 83.

Once the direction store is set equal to "INCREASE", the setpoint store in system 19 is set equal to the setpoint command signal magnitude data point in the current data set in a box, 93, in FIG. 6A. This is followed by setting the position store in system 19 equal to the valve position signal magnitude data point in the current data set in another box, 94, and then system 19 returns to await the next sample as indicated by the arrow leading from box 94 to a point just above decision diamond 71.

If system 19 in decision diamond 83 finds that valve element 10 has not traveled to a position which increases the opening controlled thereby since the previous sampling, the system then checks to see whether valve element 10 has traveled in the opposite direction to a position which closes to some degree the opening controlled thereby in a further decision diamond, 95. This is done by comparing the valve position signal magnitude data point in the current data set with the valve position signal magnitude data point stored in system 19 from the data set obtained in the previous sampling. If valve element 10 is detected in decision diamond 95 as having moved to decrease this opening, system 19 again checks in a further decision diamond, 96, as to whether the direction stored in the direction store therein in connection the last sampling equals "STOPPED" as above. If valve element 10 has been stopped just before system 19 detected that it was moving to close the opening controlled thereby in decision diamond 95, system 19 has detected that the current data set was obtained at the extreme of a dead zone and sets the low pressure store therein equal to the pressure signal magnitude data point in the current data set in another box, 97.

Here too, the contents of the high pressure store in system 19 are checked to see whether the value therein is equal to zero or not in a decision diamond, 98. If the contents in that store are zero, the contents of the low pressure store in system 19 are also set to zero in a following box, 99, and the direction store in system 19 is set equal to "DECREASE" in a further box, 100, as was originally detected in decision diamond 95. Similarly, if system 19 found in decision diamond 96 that the direction stored in the direction store therein in connection with the last sampling does not equal "STOPPED" so that the current data set was not obtained at a dead zone extreme, system 19 thereafter directs that the direction store therein be set equal to "DECREASE" in box 100.

If system 19 found in decision diamond 98 that the contents of the high pressure store were not zero indicating that a high pressure value was stored therein, system 19 calculates the frictional force as indicated in a block, 101, and stores both that frictional force and the current valve position signal magnitude data point from the current data set in the diagnostic monitor data store therein as indicated in a following block, 102. System 19 then informs diagnostic monitor 20 that such data is available as indicated in a further block, 103, and goes on to set the contents of both the high and low pressure stores therein equal to zero in a subsequent block, 104. Thereafter, system 19 sets the direction store therein equal to "DECREASE" as was originally detected in decision diamond 95, and goes on to store the setpoint command signal magnitude data point and the valve position signal magnitude data point from the current data set in the setpoint and position stores in blocks 93 and 94. Operation of system 19 is then directed to a point just above decision diamond 71 to await the data set obtained in the next sampling. In informing monitor 20 of data in both boxes 91 and 103, a user alert can be sent by system 19 if the friction found in a corresponding one of boxes 89 and 101 exceeds a user selected threshold, or a user alert can be determined by monitor 20 from the data obtained thereby exceeding such a threshold.

Should system 19 in decision diamond 95 find that valve element 10 had not moved so as to close the opening controlled thereby after finding it had not moved to increase that opening in decision diamond 83, system 19 concludes that valve element 10 must be in a condition of not moving. Once that has been determined, operation of system 19 is directed from decision diamond 95 to a following decision diamond, 105, where the system checks its direction store to determine whether the direction stored therein in connection with the preceding sampling was equal to "INCREASE". If so, system 19 sets the high pressure store therein equal to the pressure signal magnitude data point in the current data set of data points in a block, 106, since the system has detected that the current data set was obtained at the extreme of a dead zone in view of the valve element having just changed from moving to increase the opening controlled thereby to stopping that motion.

If the direction data store in system 19 does not have the direction "INCREASE" stored therein, system 19 goes on to check to determine whether that store has the direction "DECREASE" stored therein a further decision diamond, 107. If so, system 19, having found valve element 10 now stopped but moving in a direction equal to "DECREASE" in the previous sampling period, concludes the current data set was obtained at an extreme of a dead zone and therefore sets the low pressure store therein equal to the current pressure signal magnitude data point in the current data set in a further box, 108.

If, on the other hand, there has been neither INCREASE nor DECREASE stored in the direction store therein in connection with the last sampling, system 19 concludes that valve element 10 was stopped during the last sampling period and is therefore not at a dead zone extreme. Since system 19 detected that valve element 10 had stopped in decision diamond 95, system 19 sets the direction store therein equal to "STOPPED" in a further block, 109, whether the preceding direction equals "INCREASE", or "DECREASE", or neither, that is, boxes 106 and 108 both lead to box 109 as does the decision diamond 107 in the absence of the direction store having "DECREASE" stored therein.

Once system 19 has set the direction store therein equal to "STOPPED" in box 109, that system stores the setpoint command signal magnitude data point and the valve position signal magnitude data point from the current data set in the setpoint and position stores therein in blocks 93 and 94. Thereafter, operation of system 19 is directed to a point just above decision diamond 71 to await the data set to be provided by the next sampling.

Although the present invention has been described with reference to preferred embodiments, workers skilled in the art will recognize that changes may be made in form and detail without departing from the spirit and scope of the invention.

What is claimed is:

1. A method of acquiring data to represent relationships over corresponding relationship magnitude ranges between selected signals obtained from a process control device controlling at least a part of a process with that data being acquired during such controlling, said method comprising:

obtaining a succession of sets of substantially contemporaneously collected magnitude values of said selected signals during said controlling with a value of each of said selected signals forming a member of each of said sets so that corresponding members of said succession of sets form a sequence of magnitude values for a corresponding one of said selected signals;

storing selected ones of said succession of sets; and providing an indicator of a relationship between at least a pair of said selected signals over at least portions of said relationship magnitude ranges corresponding thereto by selecting a group of said stored sets with those members thereof corresponding to one of said pair of selected signals forming corresponding stored set sequences of magnitude values, said stored set sequences having therein substantially monotonic subsequences of magnitude values extending over corresponding subsequence magnitude ranges that are less in extent than those said portions of said corresponding relationship magnitude ranges over which said indicator is provided.

2. The method of claim 1 wherein said selecting of said group of said stored sets is based on said stored sets so selected sharing a common temporal characteristic.

3. The method of claim 1 wherein said selecting of said group of said stored sets is based on at least some members of said stored sets so selected sharing a common magnitude characteristic.

4. The method of claim 1 wherein said indicator is a graphical plot with axes each corresponding to one of said pair of selected signals.

5. The method of claim 1 wherein said indicator is a table of values with value entries related to said pair of selected signals.

6. The method of claim 1 wherein said storing selected ones of said succession of sets omits from storing at least some of those sets in said succession of sets having a member with a magnitude value differing by more than a selected limit value from that magnitude value of a corresponding member in that set immediately previous thereto in said succession of sets.

7. A method of acquiring data to represent pairs of points opposite one another on a closed loop in a relationship between a selected pair of signals in a plurality of selected signals obtained from a process control device controlling at least a part of a process with that data being acquired during such controlling, said method comprising:

obtaining a succession of sets of substantially contemporaneously collected magnitude values of said selected signals during said controlling with a value of each of said selected signals forming a member of each of said sets;

storing selected ones of said succession of sets; and selecting a first stored set in said succession of sets having a pair of members corresponding to said selected pair of signals including a first member in said pair thereof with a magnitude value substantially equal to a selected reference value, and selecting a second stored set having a pair of members corresponding to said selected pair of signals including a first member in said pair thereof corresponding to said first member of said first stored set, second stored set being that said stored set next in said succession of sets following said first stored set that last has said first corresponding member thereof with a magnitude value substantially equal to said selected reference value, said pair of corresponding members in each of said first and second stored sets defining a said pair of points.

8. The method of claim 7 wherein each of said pair of members of said first and second stored sets has a second member, and further comprising determining that difference in magnitude value occurring between magnitudes of said second members.

9. The method of claim 7 wherein an alerting signal is provided when said difference magnitude exceeds a selected threshold value.

10. A data acquisition system for acquiring data to represent relationships over corresponding relationship magnitude ranges between selected signals obtained from a process control device controlling at least a part of a process with that data being acquired during such controlling, said system comprising:

means for obtaining a succession of sets of substantially contemporaneously collected magnitude values of said selected signals during said controlling with a value of each of said selected signals forming a member of each of said sets so that corresponding members of said succession of sets form a sequence of magnitude values for a corresponding one of said selected signals;

means for storing selected ones of said succession of sets; and means for providing an indicator of a relationship between at least a pair of said selected signals over at least portions of said relationship magnitude ranges corresponding thereto by selecting a group of said stored sets with those members thereof corresponding to one of said pair of selected signals forming corresponding stored set sequences of magnitude values, said stored set sequences having therein substantially monotonic subsequences of magnitude values extending over corresponding subsequence magnitude ranges that are less in extent than those said portions of said corresponding relationship magnitude ranges over which said indicator is provided.

11. The apparatus of claim 10 wherein said selecting of said group of said stored sets is based on said stored sets so selected sharing a common temporal characteristic.

12. The apparatus of claim 10 wherein said selecting of said group of said stored sets is based on at least some members of said stored sets so selected sharing a common magnitude characteristic.

13. The apparatus of claim 10 wherein said indicator is a graphical plot with axes each corresponding to one of said pair of selected signals.

14. The apparatus of claim 10 wherein said indicator is a table of values with value entries related to said pair of selected signals.

15. The apparatus of claim 10 wherein said storing selected ones of said succession of sets omits from storing at least some of those sets in said succession of sets having a member with a magnitude value differing by more than a selected limit value from that magnitude value of a corresponding member in that set immediately previous thereto in said succession of sets.

16. An acquisition system for acquiring data to represent pairs of points opposite one another on a closed loop in relationship between the selected pair signals in a plurality of selected signals obtained from a process control device controlling at least a portion of the process with that data being acquired during such controlling, said system comprising:

means for obtaining a succession of sets of substantially contemporaneously collected magnitude values of said selected signals during said controlling with a value of each of said selected signals forming a member of each of said sets;

means for storing selected ones of said succession of sets; and means for selecting a first stored set in said succession of sets having a pair of members corresponding to said selected pair of signals including a first member in said pair thereof with a magnitude value substantially equal to a selected reference value, and selecting a second stored set having a pair of members corresponding to said selected pair of signals including a first member in said pair thereof corresponding to said first member of said first stored set, second stored set being that said stored set next in said succession of sets following said first stored set that last has said first corresponding member thereof with a magnitude value substantially equal to said selected reference value, said pair of corresponding members in each of said first and second stored sets defining a said pair of points.

17. The apparatus of claim 16 wherein each of said pair of members of said first and second stored sets has a second member, and further comprising determining that difference in magnitude value occurring between magnitudes of said second members.

18. The apparatus of claim 16 wherein an alerting signal is provided when said difference magnitude exceeds a selected threshold value.

* * * * *

UNITED STATES PATENT AND TRADEMARK OFFICE
CERTIFICATE OF CORRECTION

PATENT NO. : 5,687,098
DATED : November 11, 1997
INVENTOR(S) : Bruce F. Grumstrup, et al.

It is certified that error appears in the above-identified patent and that said Letters Patent is hereby corrected as shown below:

Col. 19, line 16, after " stored set," insert --said--.

Col. 17, lines 64, after "stored set,", insert --said--

Signed and Sealed this

Sixth Day of October, 1998

Attest:

BRUCE LEHMAN

Attesting Officer     Commissioner of Patents and Trademarks